L. E. BOGEN.
SYSTEM OF ELECTRICAL DISTRIBUTION.
APPLICATION FILED JULY 28, 1911.
1,023,500.
Patented Apr. 16, 1912.
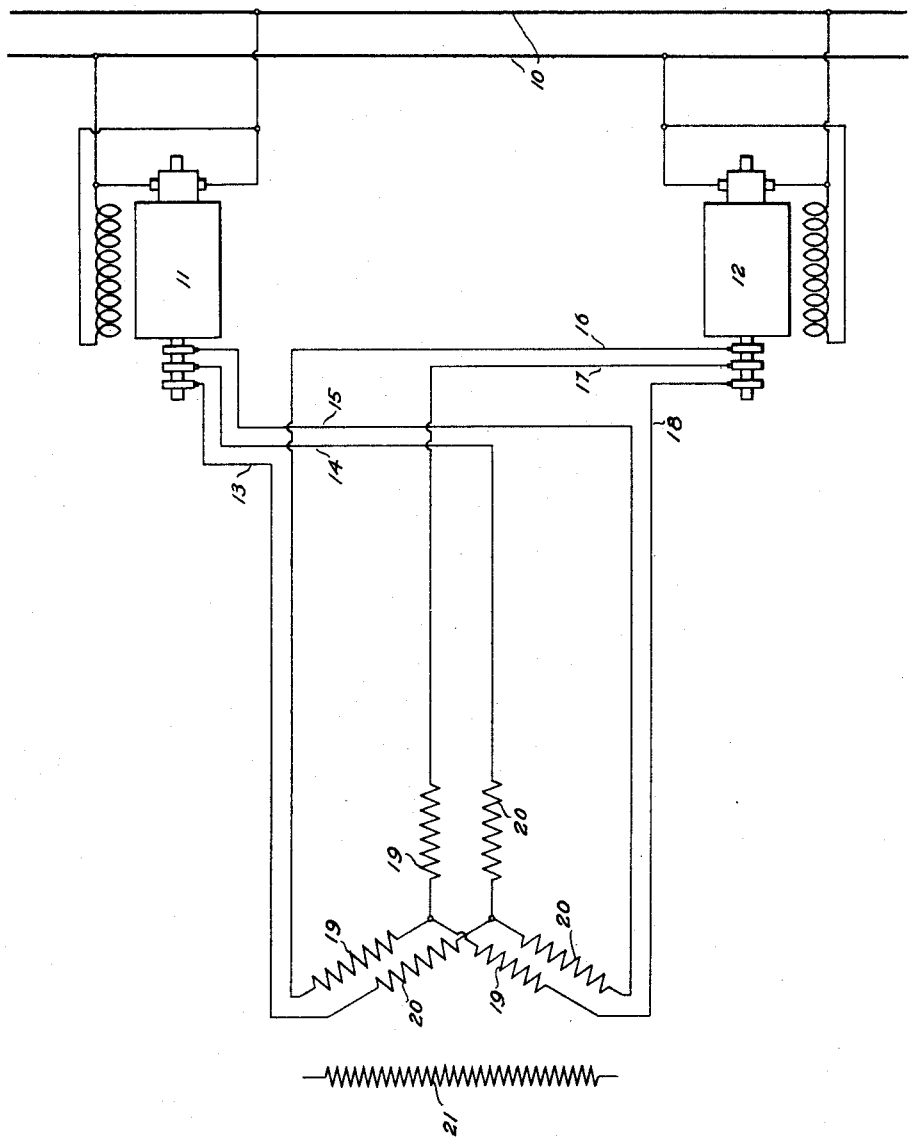

UNITED STATES PATENT OFFICE.

LOUIS E. BOGEN, OF MILWAUKEE, WISCONSIN, ASSIGNOR TO ALLIS-CHALMERS COMPANY, A CORPORATION OF NEW JERSEY.

SYSTEM OF ELECTRICAL DISTRIBUTION.

1,023,500.     Specification of Letters Patent.     Patented Apr. 16, 1912.

Application filed July 28, 1911. Serial No. 641,127.

*To all whom it may concern:*

Be it known that I, LOUIS E. BOGEN, a citizen of the United States, residing at Milwaukee, in the county of Milwaukee and State of Wisconsin, have invented certain new and useful Improvements in Systems of Electrical Distribution, of which the following is a full, clear, and exact specification.

My invention relates to systems of electrical distribution.

It is sometimes desirable to supply a direct current circuit from an alternating current generator through a number of rotary converters interconnected on their direct-current ends. If the converters are connected in parallel on both the direct current and the alternating current ends, it is usually necessary to provide special arrangements between the generator and the converters for maintaining a proper division of the load and for preventing the flow of circulating currents between the machines.

It is the object of my present invention to maintain such proper division of the load and to prevent such circulating currents and at the same time to avoid the use of special preventive devices between the generator and the rotary converter. In attaining this object, the generator is provided with a plurality of separate generating windings, the various rotary converters being connected to different ones of such windings. This avoids any electrical connection between the alternating current ends of the rotary converters, and produces most satisfactory operation. The arrangement generally necessitates no special development, for in most generators there are a number of circuits which are usually connected in parallel and it is ordinarily only necessary to omit the parallel connection in order to obtain the plurality of generating windings.

The various novel features of my invention will appear from the description and drawings and will be particularly pointed out in the claims.

The single figure of the drawing shows diagrammatically a system embodying my invention.

To the direct current circuit 10 are connected the direct current ends of two or more rotary converters 11 and 12. The alternating current ends of these rotary converters are connected by wires 13, 14, 15, and 16, 17, 18 respectively, to two similar generating windings 19 and 20 of an alternating current generator having a field winding 21. The generating windings 19 and 20 are entirely disconnected from each other. They will usually be windings which in ordinary generators are connected in parallel, in which case the two windings will produce electromotive forces exactly or substantially equal and in phase with each other. However, it is not essential that these electro-motive forces be in phase with each other, and not always essential that they be equal. The two windings 19 and 20 being electrically separate, there will be no tendency for circulating currents to flow between the different converters, and each converter will carry its proportionate share of the total energy transmitted from the generator to the direct current circuit 10.

I have illustrated my invention in one of its simplest forms, but it is not limited to such form. There may be any number of rotary converters, the number of generating windings on the alternating current generator corresponding to the number of converters. The generating windings 19 and 20 may be of any kind; though shown as three phase, star-connected, single circuit windings they may have any desired number of phases or circuits and any desired style of connection. It is not even necessary that the generating windings be all alike; if the rotary converters are different the generating windings should correspond to the proper converters rather than to each other. These and many other modifications may be made in the precise arrangement shown and described, and I aim to cover all modifications which do not involve a departure from the spirit and scope of my invention as set forth in the following claims.

What I claim as new is:

1. In combination, a direct current circuit, a plurality of rotary converters having their direct current ends connected in parallel to said circuit, and an alternating current generator having a separate generating winding connected to the alternating current end of each of said rotary converters.

2. In combination, an alternating current generator having a plurality of separate generating windings of equal voltage, a plurality of rotary converters the alternating current end of each of which is connected to one of said windings, and a direct current circuit to which the direct current ends of said rotary converters are connected in parallel.

3. In combination, two rotary converters interconnected on their direct current ends, and an alternating current generator having a separate winding connected to the alternating current end of each rotary converter.

Milwaukee, Wis., July 25, 1911.

In testimony whereof I affix my signature, in the presence of two witnesses.

LOUIS E. BOGEN.

Witnesses:
CHAS. L. BYRON,
ROB. E. STOLL.

Copies of this patent may be obtained for five cents each, by addressing the "Commissioner of Patents, Washington, D. C."